United States Patent
Premec et al.

(10) Patent No.: US 8,780,922 B2
(45) Date of Patent: Jul. 15, 2014

(54) METHOD FOR THE TRANSMISSION OF ETHERNET TRANSMISSION PROTOCOL-BASED DATA PACKETS BETWEEN AT LEAST ONE MOBILE COMMUNICATION UNIT AND A COMMUNICATION SYSTEM

(75) Inventors: Domagoj Premec, Zagreb (HR);
Maximilian Riegel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 12/086,618

(22) PCT Filed: Dec. 4, 2006

(86) PCT No.: PCT/EP2006/069252
§ 371 (c)(1),
(2), (4) Date: Jun. 16, 2008

(87) PCT Pub. No.: WO2007/068613
PCT Pub. Date: Jun. 21, 2007

(65) Prior Publication Data
US 2010/0067503 A1    Mar. 18, 2010

(30) Foreign Application Priority Data
Dec. 16, 2005    (EP) .................................. 05027664

(51) Int. Cl.
*H04L 12/46*    (2006.01)
*H04L 12/28*    (2006.01)
*H04W 76/02*    (2009.01)
*H04L 12/54*    (2013.01)
*H04L 12/24*    (2006.01)
*H04L 12/56*    (2006.01)
*H04W 80/04*    (2009.01)

(52) U.S. Cl.
CPC ........ *H04L 12/4633* (2013.01); *H04L 12/2859* (2013.01); *H04W 76/022* (2013.01); *H04L 41/048* (2013.01); *H04L 47/825* (2013.01); *H04W 80/04* (2013.01)
USPC ..................... 370/395.3; 370/392; 370/395.2; 370/395.5; 370/429

(58) Field of Classification Search
USPC ........................................................ 370/331
See application file for complete search history.

(56) References Cited

U.S. PATENT DOCUMENTS

2003/0076804 A1*    4/2003    Sivalingham .................. 370/338
2003/0224788 A1*    12/2003    Leung et al. ................ 455/435.1

(Continued)

FOREIGN PATENT DOCUMENTS

JP    2003-69642    3/2003
JP    2005-94184    4/2005

(Continued)

OTHER PUBLICATIONS

Yegani et al, "GRE Key Extension for Mobile IPv4", Jul. 10, 2005, IETF Mobile IP Working Group.*

(Continued)

*Primary Examiner* — Hanh N Nguyen
*Assistant Examiner* — Joshua A Kading
(74) *Attorney, Agent, or Firm* — Staas & Halsey LLP

(57) ABSTRACT

In order to transmit Ethernet transmission protocol-based data packets between at least one mobile communication unit and a communication system via generic route encapsulation tunneling established between a home agent unit and a foreign agent unit, at least one GRE key provided for establishing generic route encapsulation tunneling is linked to the media access control address assigned to the mobile communication unit.

18 Claims, 2 Drawing Sheets

(56) References Cited

U.S. PATENT DOCUMENTS

| | | | |
|---|---|---|---|
| 2004/0008728 A1* | 1/2004 | Lee | 370/474 |
| 2004/0013118 A1* | 1/2004 | Borella | 370/395.2 |
| 2004/0047366 A1* | 3/2004 | Chowdhury | 370/466 |
| 2004/0052238 A1 | 3/2004 | Borella et al. | |
| 2004/0085951 A1* | 5/2004 | Rezaiifar et al. | 370/352 |
| 2004/0213260 A1* | 10/2004 | Leung et al. | 370/395.3 |
| 2004/0221042 A1 | 11/2004 | Meier | |
| 2004/0267874 A1 | 12/2004 | Westberg et al. | |
| 2005/0201343 A1 | 9/2005 | Sivalingham et al. | |
| 2006/0130136 A1* | 6/2006 | Devarapalli et al. | 726/15 |
| 2006/0171365 A1* | 8/2006 | Borella | 370/338 |
| 2006/0274694 A1* | 12/2006 | Rajkumar et al. | 370/331 |
| 2010/0172324 A1 | 7/2010 | Chen | |

FOREIGN PATENT DOCUMENTS

| | | |
|---|---|---|
| JP | 2005-537767 | 12/2005 |
| JP | 2006-521732 | 9/2006 |
| KR | 2004-0085413 | 10/2004 |
| KR | 2005-0048684 | 5/2005 |

OTHER PUBLICATIONS

Dinesh Mohan [Editor] Michael Chen Vasile Radoaca Hamid Ould-Brahim Nortel Networks Pascal Menezes Terabeam Networks: "VPLS/LPE L2VPNs: Virtual Private LAN Services using Logical PE Architecture; draft-ouldbrahim-l2vpn-lpe-02.txt" Mar. 2002, IETF Standard-Working-Draft, Internet Engineering Task Force, IETF, CH, XP015004717, ISSN: 0000-0004 *paragraph [2.3.2.1]*; Others; 2002.

Parviz Yegani Gopal Dommety Cisco Systems Avi Lior Bridgewater Corp Kuntal Chowdhury Jay Navali Starent Networks: "GRE Key Extension for Mobile IPv4; draft-yegani-gre-key-extension-00.bct" IETF Standard-Working-Draft, Internet Engineeering Task Force, IETF, CH, 10.Jul. 2005, XP015039962 ISSN: 0000-0004; Others; 2005.

US 2005/0201343 (reference AA) corresponds to JP 2007-529182 (reference AG).

US 2004/0267874 (reference AB) corresponds to JP 2007-521741 (reference AH).

Office Action issued by the Korean Intellectual Property Office on Apr. 26, 2013 in the corresponding Korean patent application No. 10-2008-7017189.

\* cited by examiner

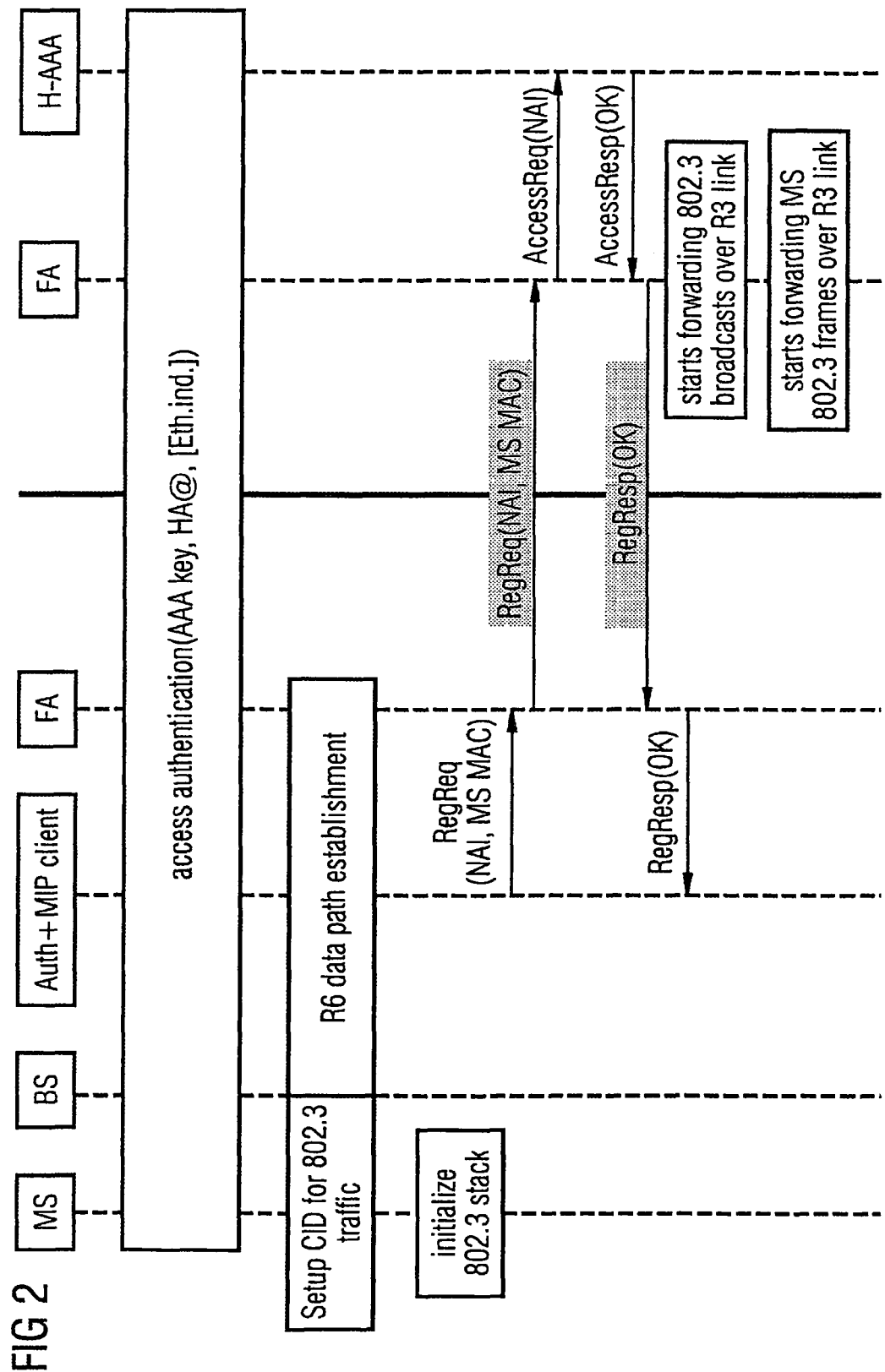

METHOD FOR THE TRANSMISSION OF ETHERNET TRANSMISSION PROTOCOL-BASED DATA PACKETS BETWEEN AT LEAST ONE MOBILE COMMUNICATION UNIT AND A COMMUNICATION SYSTEM

CROSS REFERENCE TO RELATED APPLICATIONS

This application is based on and hereby claims priority to European Application No. EP05027664 filed on Dec. 16, 1005, and PCT Application No. PCT/EP2006/069252 filed on Dec. 4, 2006, the contents of which are hereby incorporated by reference.

BACKGROUND

The invention relates to a method for transmitting data packets based on the Ethernet transmission protocol between at least one mobile communication unit and a communication system.

Existing communication systems or mobile radio systems have for example a communication network ("core network") to which individual mobile communication terminals are connected via "access networks". Among the services made available in mobile radio systems of said kind, packet-oriented communication services are also provided. In addition to the "General Packet Radio Service" (GPRS) access technology, packet-oriented communication services are provided within the mobile communication system by way of further access technologies such as, for example, the "Worldwide Interoperability for Microwave Access" (WIMAX) technology.

Of particular importance in the context of packet-oriented data transmission is the Internet Protocol (IP) transmission protocol, which enables individual data packets to be switched via different transmission systems by cross-network addressing based on what are referred to as IP addresses. Version 4 of the Internet Protocol (IPv4), which has a 32-bit address system and theoretically supports an address space of up to four billion IP addresses, is currently the most widespread. In practice, however, a large proportion of these addresses cannot be used due to group forming and other mechanisms. Consequently, owing to the constantly growing number of Internet users it is necessary to create IP addresses with a larger address space. Toward that end, work has been in progress for several years on a version 6 of the Internet Protocol (IPv6). The new IPv6 has, for example, a considerably larger address space on account of a 128-bit address system. This increases the number of potentially available IP addresses many times over.

An extension to the traditional Internet Protocol is the Mobile Internet Protocol, also called Mobile IP or MIP, which enables data packets to be transported beyond mobile communication network boundaries. A distinction is made here between versions MIPv4 and MIPv6, which supported the different versions 4 and 6, respectively, of the IP transmission protocol. The Mobile IP transmission protocol in combination with version 4 of the Internet Protocol (IPv4) is in use at the present time. Three new functional entities have been defined in connection with the Mobile IP transmission protocol (RFC 3344): mobile network node, home agent and foreign agent:

A mobile network node, or "mobile node" (MN), is understood to mean a computer unit which can change its access point in the mobile communication system and in the process maintains an existing data connection and only uses an IP address for the purpose of unique identification.

A home agent (HA) is a router/computer unit having an interface to the home communication network of the mobile network node. It is notified by the mobile network node of the latter's current location, receives data packets addressed to the mobile network node and forwards these packets to the mobile network node.

The term "foreign agent" (FA) is used to describe a router/computer unit in the foreign communication network which forwards data packets to the mobile network node and serves as a standard router unit for data packets generated by the mobile network node.

Each mobile node possesses two addresses: a home address and what is referred to as a "care-of address". The home address is the IP address by which the mobile network node is known to its communication partners. It is "permanently" assigned to the mobile node and remains fixed even when, for example, the mobile network node roams in the mobile communication network. The front part of the home address, which specifies the network, is identical to the network prefix which the host and router units possess in the home communication network of the mobile network node.

The care-of address (COA) is an IP address which is used as a temporary address by a mobile network node when it visits a foreign communication network. It is specific to the foreign communication network and changes as soon as the mobile network node visits a new foreign communication network. The care-of address therefore defines the location of the mobile network node and represents the address to which the data packets addressed to the mobile network node are forwarded.

Also known from the RFC 1701 and 1702 standards is the "Generic Route Encapsulation" (GRE) transmission protocol, wherein in conjunction with the "Point-to-Point Tunneling Protocol" (PPTP) a tunnel connection is set up between, for example, a virtual private communication network (VPN) and a client or between a plurality of clients or between clients and server unit. For this purpose the encrypted useful load ("payload") is inserted into a GRE data packet and transferred between the endpoints via a transport protocol of the tunnel. Following this, the further switching of the data packet transmitted via the tunnel to the recipient takes place using a "normal" transmission protocol such as, for example, the IP transmission protocol. For this purpose, according to the GRE transmission protocol a key field is provided in which a GRE key is stored via which the data packet is identified.

An extension to the Mobile IPv4 transmission protocol for the purpose of exchanging GRE keys is known from the Internet publication "GRE Key Extensions for Mobile IPv4" by Parviz Yegani et al, IETF Mobile IP Working Group. In this, a method for setting up a tunnel connection between a foreign agent and a home agent is described wherein the configuration of the home agent executing the Mobile IPv4 transmission protocol can be maintained unchanged and at the same time overlaps in the IPv4 address range are avoided.

In the mobile communication network, the foreign agent is additionally assigned an Access Service Network Gateway (ASN-GW) unit, and the home agent a Connectivity Service Network (CSN) unit. In this case the foreign agent and the home agent are connected to each other via an interface provided with the identifier R3. According to the current standardization status, although the IPv4 and IPv6 data transmission protocols are supported by the at least partially standardized R3 interface, the Ethernet data transmission protocol is by no means supported simultaneously.

SUMMARY

One potential object is to provide a method for transmitting data packets via the IPv4 and/or the Ethernet transmission protocol between a home agent unit and a foreign agent unit.

The inventors propose that at least one of the GRE keys provided for setting up the "Generic Route Encapsulation" (GRE) tunnel connection is linked with the media access control address of the mobile communication terminal. As a result of this, the Mobile IP protocol is not dependent on either the IP address that is exchanged between the FA unit and the HA unit or on the respective address information in the "payload header" of the GRE tunnel connection set up between the FA unit and the HA unit. Thus, in the method the GRE tunnel connection provided via the third interface R3 is made independent of the transmission protocol used in a particular case. This enables IP-based or Ethernet-based data packets to be transmitted between the Access Service Network unit and the Connectivity Service Network unit CSN. Support for mobile Ethernet communication services is therefore possible in a communication system in an analogous manner to the IP-based communication services. Furthermore, individually addressable host units connected to the communication system via the mobile communication terminal as well as a multiplicity of mobile VLANs can be supported. The method described is completely transparent in all network configurations.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a schematic block diagram depicting by way of example a mobile communication system for carrying out one potential embodiment of the proposed method and FIG. 2 is a signaling diagram depicting by way of example the signaling steps performed between the individual units of the mobile communication system shown in FIG. 1.

DETAILED DESCRIPTION OF THE PREFERRED EMBODIMENT

Figure 1:
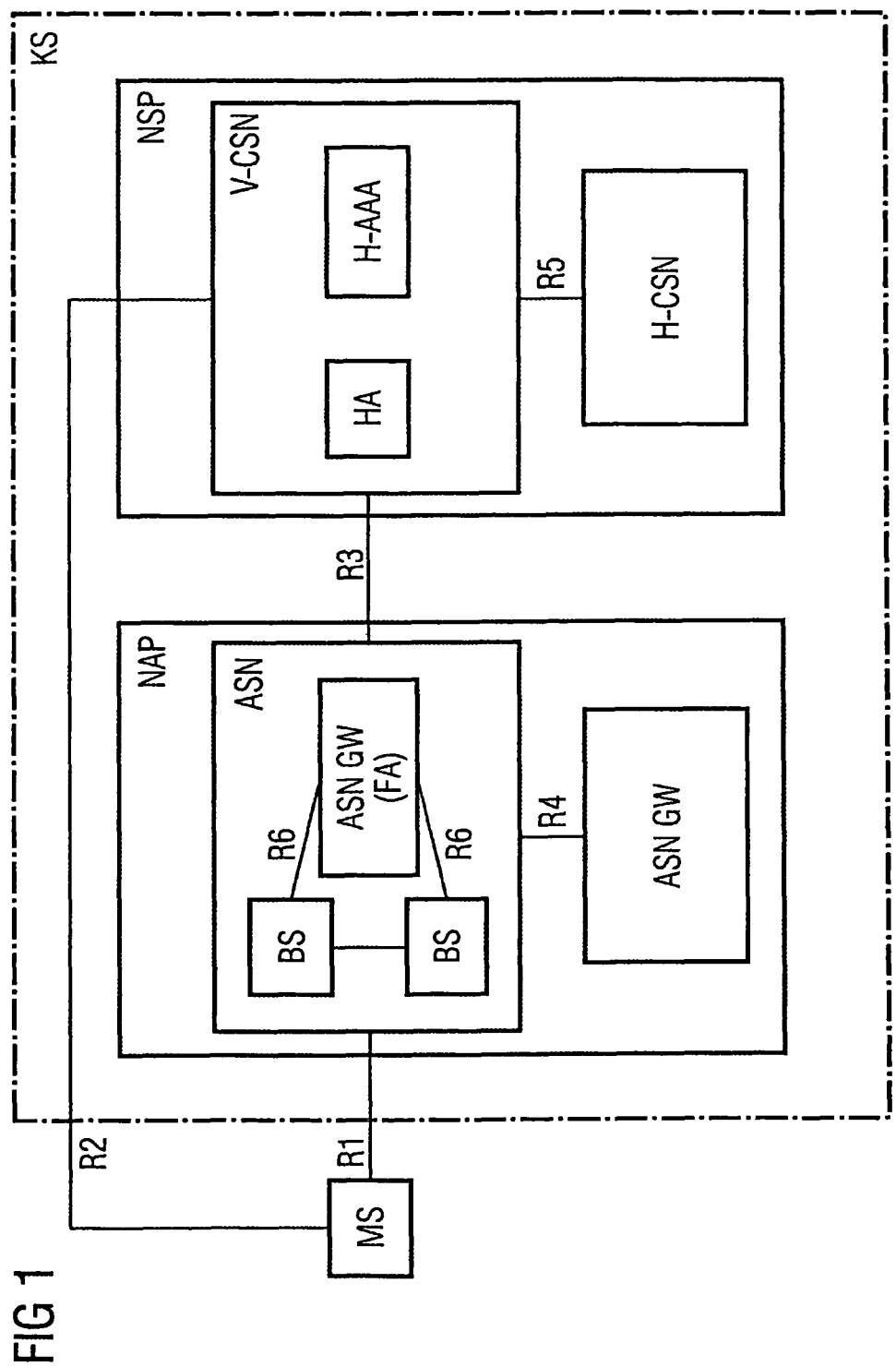

Reference will now be made in detail to the preferred embodiments of the present invention, examples of which are illustrated in the accompanying drawings, wherein like reference numerals refer to like elements throughout.

FIG. 1 is a schematic block diagram depicting an example of a communication system KS to which a mobile communication unit MS is connected. The communication system KS has a "Network Access Provider" (NAP) unit NAP and a "Network Service Provider" (NSP) unit NSP which are each connected to one another and to the mobile communication terminal MS.

The NAP unit NAP has a mobile access network ("Access Service Network") ASN to which an "Access Service Network Gateway" (ASN-GW) unit ASN-GW is assigned. The NSP unit NSP has a "Visited Connectivity Service Network" (V-CSN) unit V-CSN and a "Home Connectivity Service Network" (H-CSN) unit H-CSN. The mobile communication unit MS is additionally connected via a first interface R1 to the NAP unit NAP and via a second interface R2 to the V-CSN unit V-CSN. The mobile access network ASN has a connection to the V-CSN unit V-CSN via a third interface R3 as well as a connection to the ASN-GW unit ASN-GW via a fourth interface R4. The V-CSN unit is connected via a fifth interface R5 to the H-CSN unit H-CSN.

Also provided in the NAP unit NAP or its mobile access network ASN is a foreign agent (FA) unit FA which is assigned to the ASN-GW unit ASN-GW and is connected, for example, to a first and second base station BS. A sixth interface R6 is provided for connecting the base station BS to the FA unit FA and a further interface is provided for connecting the base stations BS to one another. A home agent (HA) unit HA and an "Access Authentication" (AAA) unit H-AAA are also provided in the V-CSN unit V-CSN.

The mobile access network ASN is preferably embodied as a "Worldwide Interoperability for Microwave Access" (WiMAX) access network and supports the transmission of data packets via the Mobile IP transmission protocol version 4 (MIPv4).

Both the IP transmission protocol and the Ethernet transmission protocol are supported by the mobile communication unit MS.

As the "protocol stack" illustrated below shows, the Ethernet transmission frame generated by the mobile communication unit MS is transmitted transparently to the CSN unit CSN by a GRE tunnel connection.

From the viewpoint of the mobile communication unit MS, the mobile access network ASN and the HA unit HA, the GRE tunnel connection thus forms a kind of "Ethernet bridge".

| Protocol stack | | | | | | | |
|---|---|---|---|---|---|---|---|
| ASN | | | | | | CSN | |
| 802.3 | | | | | | 802.3 | 802.3 |
| CS | CS | DP Fn | DP Fn | MIPv4 | MIPv4 | | |
| 802.16 MAC | 802.16 MAC | L2 | L2 | L2 | L2 | | |
| 802.16 PHY | 802.16 PHY | L1 | L1 | L1 | L1 | L1 | L1 |
| MS | BS | | FA | | HA | | Peer |

FIG. 2 shows by way of example with the aid of a schematic signaling diagram the individual signaling steps between the units of the communication system KS shown in FIG. 1. In particular, the signaling messages for setting up a GRE tunnel connection that are transmitted between the mobile communication unit MS and the individual units of the communication system MKS for the purpose of implementing the proposed method are explained in more detail.

Toward that end, an "access authentication" is first performed between the components shown in FIG. 2 of the communication system KS according to FIG. 1 in an analogous manner to the PMIP/CMIP methods known from the related art. Also transmitted as part of the "access authentication" process in addition to the customary AAA key ("AAA key") and the HA address ("HA@") is an indication parameter which indicates that the mobile communication unit MS supports the transmission of data packets in accordance with the Ethernet transmission protocol.

Said indication parameter is embodied for example as an optional "Radius attribute" which supports company-specific extensions. Furthermore, said indication parameter can be evaluated for example by an MIP client application executed in the mobile access network ASN.

In an alternative variant, support for the Ethernet protocol by the mobile communication terminal MS is established by the MIP client application in that the indication parameter is transmitted by an "authenticator", by way of a "CS capabilities" parameter provided in an RNG request/RSP response message, for example. The indication parameter can also be transferred by the AAA unit H-AAA as part of the "access authentication" process.

Independently hereof, a Registration Request message is generated by the MIP client application for the purpose of setting up a GRE tunnel connection via the third interface R3 and transmitted to the FA unit FA. An MIPv4 home address or MIPv4 IP address assigned to the mobile communication unit MS and containing only zeroes is inserted in the Registration Request message.

Additionally provided in the Registration Request message is an "Ethernet extension" to which the "media access control" (MAC) address MS MAC of the mobile communication unit MS is assigned. In this case the Ethernet extension has, for example, the format of "extensions" of this kind described in the RFC 3344 standard as part of the Mobile IPV4 transmission protocol.

The Registration Request message received by the FA unit FA is forwarded to the HA unit HA and in the latter, following reception of the Registration Request message, an application for a "GRE encapsulation" is submitted by the home agent HA to the AAA unit H-AAA by an Access Request message. In the process the FA unit indicates to the HA unit HA by setting the G flag in the Registration Request message that it supports the "GRE encapsulation" method (see in this regard Internet publication "GRE Key Extensions for Mobile IPv4" by Parviz Yegani et al, IETF Mobile IP Working Group).

In accordance with the standardized GRE method a GRE key is also assigned by the FA unit FA and inserted into a GRE extension provided as standard. In this case the GRE extension is preferably situated between the MN-HA challenge and MN-FA challenge and MN-AAA extensions (if present), though in front of the FA-HA authorization extension. The FA unit FA stores the GRE key inserted in the Registration Request message as part of its context information and links the assigned GRE key with the mobile communication unit MS.

Following reception of the Registration Request message by the HA unit HA, the latter reads out the MAC address contained in the Ethernet extension and links the read-out MAC address of the mobile communication unit MS with its care-of address (COA). In addition, the received GRE key is added or assigned to the mobility binding context information by the HA unit. The HA unit HA also generates a further GRE key and sends this back to the FA unit FA in a Registration Response message.

Following successful registration, the Ethernet-transmission-protocol-based data packets to which the previously read-out MAC address is assigned are determined by the HA unit HA. The determined data packets or Ethernet transmission frames are then forwarded by the HA unit HA to the FA unit FA via the established GRE tunnel connection. In this process the GRE key assigned by the FA unit FA is inserted into the GRE data packet header by the HA unit HA.

Based on the received GRE key, the FA unit FA identifies that mobile communication unit MS to which the Ethernet transmission frame or data packets are to be transmitted. Thus, the inner data packet header, in particular the MAC address contained therein is not used by the FA unit FA to determine the assigned mobile communication terminal MS. This is advantageous in particular when a plurality of host units are connected to the mobile communication unit MS. In such a case the HA unit HA then determines the MAC address of the host units between the mobile communication unit MS as soon as Ethernet transmission frames or data packets generated by the host units are sent after the GRE tunnel connection has been set up.

After the MAC addresses of the host units disposed "behind" the mobile communication unit MS have been determined, data packets addressed to the determined MAC addresses of the host units are transmitted directly by the HA unit HA via the GRE tunnel connection. In this process the data packets addressed to the host units are in turn provided with the GRE key of the FA unit FA by the HA unit HA.

The FA unit FA in turn monitors only the GRE keys contained in the data packets transmitted via the GRE tunnel connection in order to identify on this basis the assigned mobile communication unit MS to which the encrypted "payload" of the received data packet is to be forwarded. In the uplink direction, i.e. when data packets are sent by the mobile communication unit MS or its assigned host units into the communication system KS, the GRE key contained in the received data packets is evaluated by the HA unit HA instead of the destination address of the "inner header elements" of the data packet in order to determine the assigned "mobility context content".

In addition, an "Ethernet broadcast" can also be sent via the home link connection by the HA unit HA via all GRE tunnel connections set up via the third interface R3 which have the previously described Ethernet extension.

Following successful registration of the tunnel connection via the third interface R3 it is possible by the mobile communication terminal MS to use further data transmission protocols assigned to higher layer levels such as, for example, IPv4 or IPv6 without adaptations of these. Data packets based on the IPv4 or IPv6 transmission protocol, for example, are transferred and processed in the mobile access network ASN completely transparently with regard to the Ethernet transmission protocol executed in the mobile communication terminal MS.

In order to implement the proposed method, the following changes must therefore be carried out in the HA unit HA in contrast to the previously standardized methods:

- Interception and insertion of Ethernet transmission frames on the home link connection, wherein the HA unit HA acts as a bridge with GRE tunnel connections set up via the third interface R3.
- Support for Ethernet extensions in the standardized Registration Request/Registration Request Reply method. The reception of Registration Request messages having Ethernet extensions directs the HA agent HA into an operating state which forms a "bridge" for the MAC address assigned in the Ethernet extensions in each case.
- Generation of a bidirectional tunnel connection for transmitting Ethernet-based data packets via the third interface R3.

The following changes must be carried out in the FA unit FA:

- Generation of a bidirectional tunnel connection for transmitting Ethernet-based data packets via the third interface R3.
- Setting up of a GRE tunnel connection in accordance with the standardized GRE method with additional support for GRE keys.
- Support for Ethernet extensions in the standardized Registration Request/Registration Request Reply method.
- The received Ethernet extensions in a Registration Request message are evaluated by the PMIP client application and, based hereon, GRE extensions are sent via the Registration Request message to the HA unit HA.

As part of the registration method, support for the Ethernet transmission protocol by the mobile communication unit MS is additionally determined by the MIP client application and, dependent hereon, the Ethernet extension sent via the Registration Request message.

LIST OF REFERENCE SIGNS

ASN Mobile access network

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for transmitting Ethernet-transmission-protocol-based data packets, comprising:
    providing one or more Generic Route Encapsulation (GRE) keys for establishing a generic route encapsulation tunnel connection between a home agent unit and a foreign agent unit;
    providing an Ethernet extension in the Ethernet-transmission-protocol-based data packets and inserting a media access control (MAC) address assigned to a mobile communication unit into the Ethernet extension of the Ethernet-transmission-protocol-based data packets;
    assigning, by the foreign agent, at least one of the one or more GRE keys and linking the assigned at least one GRE key with the mobile communication unit;
    reading out, by the home agent, the MAC address contained in the Ethernet extension, linking the read out MAC address of the mobile communication unit with a care-of address of the mobile communication unit, generating at least one other GRE key of the one or more GRE keys, and sending the generated at least one other GRE key to the foreign agent; and
    transmitting the Ethernet-transmission-protocol-based data packets with generic route tunneling between the mobile communication unit and a communication system.

2. The method as claimed in claim 1, wherein
    a first GRE key is provided in the foreign agent unit and a second GRE key is provided in the home agent unit, and
    both the first and second GRE keys are linked with the MAC address of the mobile communication unit.

3. The method as claimed in claim 2, wherein
    a Registration Request message is transmitted by the foreign agent unit to the home agent unit for establishing the GRE tunnel connection,
    a Registration Reply message is transmitted by the home agent unit to the foreign agent unit for establishing the GRE tunnel connection, and
    the first GRE key provided in the foreign agent unit and the second GRE key provided in the home agent unit are exchanged between the foreign agent unit and the home agent unit via the Registration Request message and the Registration Reply message respectively.

4. The method as claimed in claim 2, wherein
    a Registration Request message is transmitted by the foreign agent unit to the home agent unit for establishing the GRE tunnel connection,
    the MAC address of the mobile communication unit is inserted in an Ethernet extension, and
    the Ethernet extension is provided in the Registration Request message.

5. The method as claimed in claim 4, wherein
    a Registration Reply message is transmitted by the home agent unit to the foreign agent unit for establishing the GRE tunnel connection, and
    the Ethernet extension is provided in the Registration Reply message.

6. The method as claimed in claim 5, wherein
    the first GRE key provided in the foreign agent unit and the second GRE key provided in the home agent unit are exchanged between the foreign agent unit and the home agent unit via the Registration Request message and the Registration Reply message respectively.

7. The method as claimed in claim 6, wherein
    the GRE tunnel connection is set up via a standardized R3 interface.

8. The method as claimed in claim 7, wherein
    the foreign agent unit has an Mobile IP transmission protocol (MIP) client application executed therein, and
    as part of an access authentication process, an indication parameter is transmitted to the foreign agent unit and/or the MIP client application executed therein, and
    the indication parameter indicates that the mobile communication unit supports transmission of data packets based on an Ethernet transmission protocol.

9. The method as claimed in claim 8, wherein
    the Registration Request message is generated by the MIP client application and made available to the foreign agent unit.

10. The method as claimed in claim 9, wherein
    an MIP home address containing only zeroes is assigned to the mobile communication unit, and
    the MIP home address is inserted into the Registration Request message by the MIP client application.

11. The method as claimed in claim 10, wherein
    the Ethernet extension provided in the Registration Request message and in the Registration Reply message is formatted in accordance with RFC 3344 standard.

12. The method as claimed in claim 1, wherein
    a Registration Request message is transmitted by the foreign agent unit to the home agent unit for establishing the GRE tunnel connection, and
    the Ethernet extension is provided in the Registration Request message.

13. The method as claimed in claim 12, wherein
    the foreign agent unit has a Mobile IP transmission protocol (MIP) client application executed therein, and
    the Registration Request message is generated by the MIP client application and made available to the foreign agent unit.

14. The method as claimed in claim 13, wherein
    an MIP home address containing only zeroes is assigned to the mobile communication unit, and
    the MIP home address is inserted into the Registration Request message by the MIP client application.

15. The method as claimed in claim 12, wherein
    a Registration Reply message is transmitted by the home agent unit to the foreign agent unit for establishing the GRE tunnel connection,
    the Ethernet extension is provided in both the Registration Request message and the Registration Reply message, and
    the Ethernet extension is formatted in accordance with RFC 3344 standard.

16. The method as claimed in claim 1, wherein
a Registration Reply message is transmitted by the home agent unit to the foreign agent unit for establishing the GRE tunnel connection, and
an Ethernet extension is provided in the Registration Reply message.

17. The method as claimed in claim 1, wherein
the GRE tunnel connection is set up via a standardized R3 interface.

18. The method as claimed in claim 1, wherein
the foreign agent unit has an Mobile IP transmission protocol (MIP) client application executed therein, and
as part of an access authentication process, an indication parameter is transmitted to the foreign agent unit and/or the MIP client application executed therein, and
the indication parameter indicates that the mobile communication unit supports transmission of data packets based on an Ethernet transmission protocol.

\* \* \* \* \*

UNITED STATES PATENT AND TRADEMARK OFFICE
CERTIFICATE OF CORRECTION

PATENT NO. : 8,780,922 B2  
APPLICATION NO. : 12/086618  
DATED : July 15, 2014  
INVENTOR(S) : Domagoj Premec et al.

Page 1 of 1

It is certified that error appears in the above-identified patent and that said Letters Patent is hereby corrected as shown below:

On the Title Page, Column 1, Item [75], Line 2, Delete "Nümberg (DE)" and insert -- Nürnberg (DE) --, therefor.

On the Title Page, Page 2, Item [56] (Other Publications), Column 2, Line 11, Delete "Engineeering" and insert -- Engineering --, therefor.

In the Claims

Column 1, Line 13, Delete "1005," and insert -- 2005, --, therefor.

Signed and Sealed this  
Fourth Day of November, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,780,922 B2  
APPLICATION NO. : 12/086618  
DATED : July 15, 2014  
INVENTOR(S) : Domagoj Premec et al.

It is certified that error appears in the above-identified patent and that said Letters Patent is hereby corrected as shown below:

On the Title Page, Column 1, Item [75], Line 2, Delete "Nümberg (DE)" and insert -- Nürnberg (DE) --, therefor.

On the Title Page, Page 2, Item [56] (Other Publications), Column 2, Line 11, Delete "Engineeering" and insert -- Engineering --, therefor.

In the Specification

Column 1, Line 13, Delete "1005," and insert -- 2005, --, therefor.

This certificate supersedes the Certificate of Correction issued November 4, 2014.

Signed and Sealed this  
Twenty-fifth Day of November, 2014

Michelle K. Lee  
*Deputy Director of the United States Patent and Trademark Office*